(12) United States Patent
Nikkel et al.

(10) Patent No.: US 8,776,701 B2
(45) Date of Patent: Jul. 15, 2014

(54) ROW CROP FERTILIZER APPLYING APPARATUS

(75) Inventors: Lee F. Nikkel, Madrid, NE (US); Eugene H. Schmidt, Madrid, NE (US)

(73) Assignee: A.I.L., Inc., North Platte, NE (US)

( * ) Notice: Subject to any disclaimer, the term of this patent is extended or adjusted under 35 U.S.C. 154(b) by 326 days.

(21) Appl. No.: 12/957,887

(22) Filed: Dec. 1, 2010

(65) Prior Publication Data

US 2012/0137942 A1  Jun. 7, 2012

(51) Int. Cl.
*A01C 23/00* (2006.01)

(52) U.S. Cl.
USPC ............................................ 111/121; 111/167

(58) Field of Classification Search
USPC .......... 111/118, 121, 164, 166, 167; 172/604, 172/540, 520, 575, 739
See application file for complete search history.

(56) References Cited

U.S. PATENT DOCUMENTS

| | | | |
|---|---|---|---|
| 526,436 A | 9/1894 | Campbell | |
| 736,763 A | 8/1903 | Ham | |
| 736,963 A * | 8/1903 | Ham | 111/165 |
| 842,066 A * | 1/1907 | Beymer | 172/156 |
| 1,183,088 A * | 5/1916 | Lippert | 172/575 |
| 2,058,539 A * | 10/1936 | Welty et al. | 111/73 |
| 2,672,718 A * | 3/1954 | Thomas | 172/45 |
| 2,842,078 A | 4/1958 | Immesoete | |
| 2,920,587 A | 1/1960 | Shriver | |
| 3,701,327 A | 10/1972 | Krumholz | |
| 3,746,100 A | 7/1973 | Hall et al. | |
| 4,040,762 A | 8/1977 | Nilsson | |
| 4,077,478 A | 3/1978 | Neukom | |
| 4,207,949 A | 6/1980 | Sjovall | |
| 4,275,671 A | 6/1981 | Baker | |
| 4,601,602 A | 7/1986 | Schnitzler | |
| 4,646,663 A | 3/1987 | Nikkel et al. | |
| 4,655,295 A | 4/1987 | Barnes et al. | |
| 4,745,978 A * | 5/1988 | Williamson | 172/166 |
| 4,765,262 A | 8/1988 | Morgan | |
| 4,930,431 A | 6/1990 | Alexander | |
| 4,947,770 A * | 8/1990 | Johnston | 111/121 |
| 5,140,917 A | 8/1992 | Swanson | |
| 5,269,237 A | 12/1993 | Baker et al. | |
| 5,282,396 A | 2/1994 | Crandall | |
| 5,398,771 A | 3/1995 | Hornung et al. | |
| 5,458,203 A * | 10/1995 | Evers | 172/569 |

(Continued)

FOREIGN PATENT DOCUMENTS

GB  700597  12/1953

*Primary Examiner* — Jamie L McGowan
(74) *Attorney, Agent, or Firm* — Greer, Burns & Crain, Ltd.

(57) ABSTRACT

Embodiments are directed to an apparatus for use in applying fertilizer in the ground adjacent to a row line of seeds being planted by a planter the apparatus comprising a frame mounted to the planter, and having at least one mount structure extending from a forward end of the frame, a disk structure mounted to each of the mount structures and configured to be horizontally pivotable about a selected one of multiple forwardly located pivot points on the mount structure, the disk structure being horizontally pivotably attached to the mount structure at one of the pivot points, the disks forming a V shaped opening in the ground during forward movement, a fertilizer applying structure mounted to the apparatus for delivering a fertilizer into the V shaped opening, wherein each of the multiple pivot points delivers fertilizer into the V shaped opening at predetermined lateral distances from the row line of seeds being planted by the planter.

17 Claims, 7 Drawing Sheets

(56) References Cited

U.S. PATENT DOCUMENTS

| | | | |
|---|---|---|---|
| 5,497,716 A | 3/1996 | Shoup | |
| 5,497,717 A | 3/1996 | Martin | |
| 5,556,224 A | 9/1996 | Niskanen | |
| 5,724,902 A * | 3/1998 | Janelle et al. | 111/164 |
| 5,752,453 A * | 5/1998 | Nikkel et al. | 111/121 |
| 6,067,918 A * | 5/2000 | Kirby | 111/121 |
| 6,213,035 B1 * | 4/2001 | Harrison | 111/164 |
| 6,237,697 B1 * | 5/2001 | Butterfield et al. | 172/566 |
| 6,578,502 B1 * | 6/2003 | Barnstable et al. | 111/164 |
| 7,395,770 B2 * | 7/2008 | Neudorf et al. | 111/121 |
| 7,581,503 B2 * | 9/2009 | Martin et al. | 111/167 |
| 2005/0045080 A1 * | 3/2005 | Halford et al. | 111/118 |

* cited by examiner

ROW CROP FERTILIZER APPLYING APPARATUS

BACKGROUND OF THE INVENTION

The present invention generally relates to fertilizer applying apparatus and more particularly to a fertilizer applying apparatus for applying fertilizer to agricultural row crops.

Agricultural producers continue to try to find ways in which to make their operations more efficient and effective. The efficient use of the land requires that production be maximized, and for growing corn and other row crops, it is a practical necessity to fertilize the seeds when they are planted. If the application of fertilizer is done at the same time as the seed is planted, it is important for the fertilizer to be applied at a position adjacent to the seeds so that the fertilizer will be able to provide nutrients to benefit the seed, but not be so close that it will burn the seed.

The spacing between the applied fertilizer and the seed row is only one factor that must be considered. Other factors include the type and amount of fertilizer that is desirably applied, the depth at which the fertilizer is applied, and the amount of fertilizer that is desired when the particular crop being planted. The ability to apply fertilizer on both sides of the seed row is also a practice that is becoming increasingly prevalent. For these reasons, flexibility is extremely important for providing variations in the application of fertilizer for row crops.

It is also known that the planting of seed corn must be at a prescribed depth in the soil to achieve optimum emergence of the crop. It is also very desirable that the fertilizer be applied in the soil at a predetermined consistent depth that is about one half inch above the seed or as much as about two inches below the seed. However, the fertilizer should also be laterally spaced from the seed, preferably about two inches to about four inches to the side of the seed row, so that a buffer zone of soil is maintained between the fertilizer and the seed, which prevents the fertilizer from burning the seed itself. Seed planters typically have a pair of disks which part the soil and place the seed at a predetermined depth and these disks are set up to provide a true, i.e., symmetrical, V, where the center line of the V is substantially vertical. It is known that with a true V, the emergence of the crop is maximized. It is also known that fracturing the soil in a manner which disturbs the true V has an undesirable effect on the emergence of the crop.

While it is known that fertilizer should be applied relative to the seed as described, it is easier said than done. In addition to applying the fertilizer at the correct depth and lateral distance from the seed row, it is important that the fertilizer be applied in the manner whereby the seed bed itself is or will not be disturbed because of the fracturing of the soil by the fertilizer applying apparatus during operation. This can occur regardless of whether the seed is planted ahead or behind the fertilizer applying apparatus in the direction of movement through a field. A common problem in prior art fertilizer applying apparatus is the tendency for them to fracture the soil adjacent the seed and push the seed off to the side of the desired row line. Such fracturing distorts the seed bed which can significantly affect the emergence of the crop. For example, if the seed bed is distorted, by being pushed to the side, the plant may emerge at an undesirable angle which can affect the vitality of the plant and ultimately the yield.

SUMMARY OF THE INVENTION

Embodiments of the present invention are directed to an apparatus for use in applying fertilizer in the ground adjacent to a row line of seeds being planted by a planter during travel in a forward direction, the apparatus comprising a frame structure mounted to the planter, and having an elongated portion extending forwardly of the planter, the frame having at least one mount structure extending transversely from a forward end of the elongated portion, a disk structure mounted to each of the mount structures and configured to be horizontally pivotable about a selected one of multiple forwardly located pivot points relative to the mount structure, the disk structure being pulled along the ground as the apparatus is moved forwardly, the disk structure further comprising an arm assembly that is horizontally pivotably attached to the mount structure at one of the pivot points, a standard attached to the arm assembly, the standard carrying first and second rotatable substantially planar disks, each of which is mounted on opposite sides of the standard, the first disk and second disks being generally vertically oriented, with the second disk being configured and oriented relative to the first disk so that a forward reach of the second disk is closely adjacent to the first disk and is slightly rearward of the first disk and is near a bottom of a reach of the first disk, the first and second disks forming a generally V shaped opening in the ground as the apparatus travels in the forward direction, a fertilizer applying structure mounted to the apparatus for delivering a fertilizer into the generally V shaped opening in the ground, wherein each of the multiple pivot points delivers fertilizer into the generally V shaped opening at predetermined lateral distances from the row line of seeds being planted by the planter.

DETAILED DESCRIPTION

Figure 1:
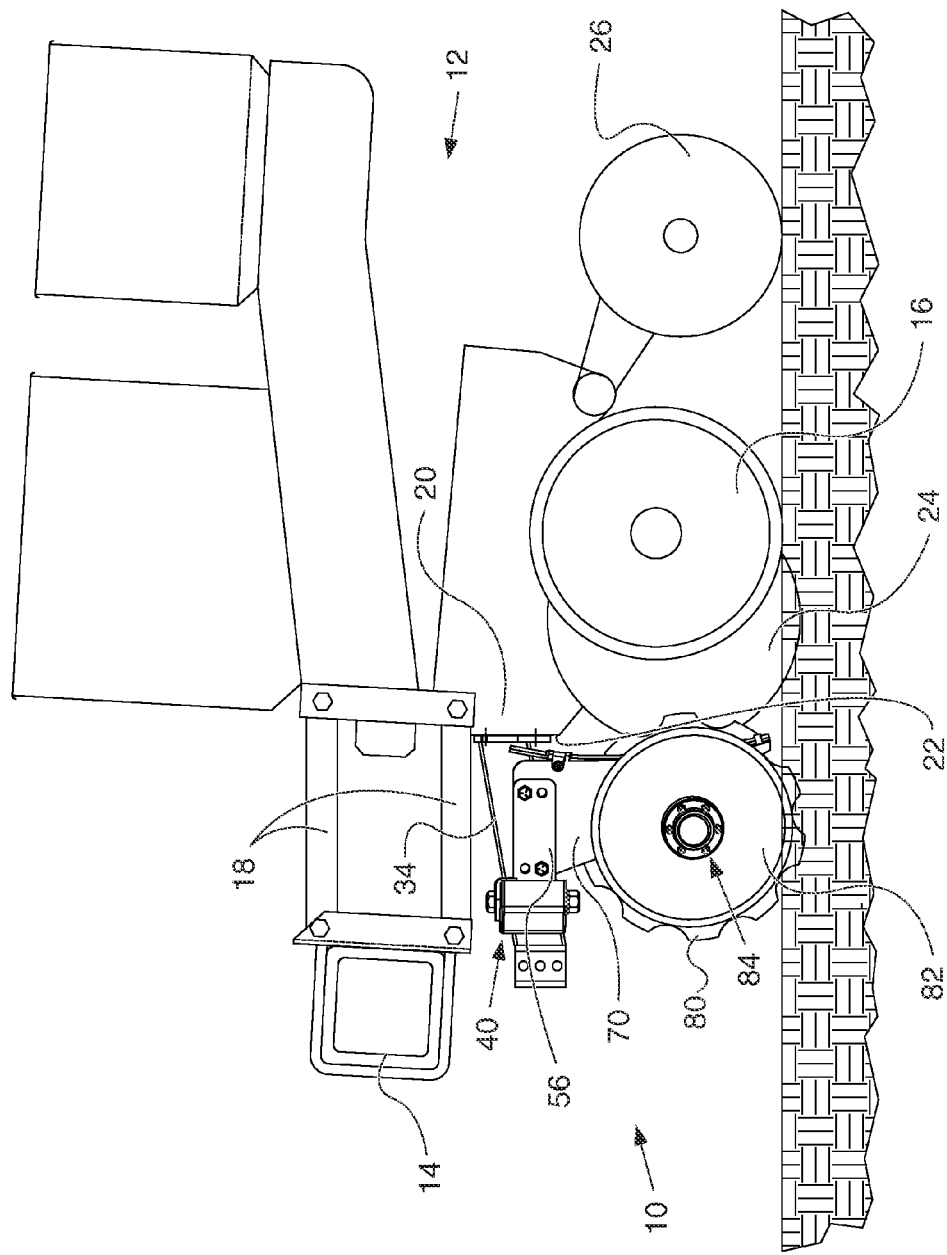
FIG. 1 is a left side view of the apparatus embodying the present invention shown in conjunction with a planting implement.

Broadly stated, the present invention is directed to a fertilizer applying apparatus for use in the farming of row crops such as corn where fertilizer is applied to the row of seeds as they are planted. The apparatus disclosed herein is configured to apply either liquid or dry fertilizer in the ground at a variable predetermined depth as well as at multiple lateral positions relative to the row line of seeds so as to facilitate the feeding of nutrients to the seed without burning the seed. The design and configuration of the embodiments of the present invention enable great flexibility in controlling the application of fertilizer adjacent a seed row line, which includes varying the lateral distance of the placement of the fertilizer relative to the seed row line, as well as its depth. The lateral distance can be varied in a manner that does not cause undesirable fracturing of the soil, which as has been stated above, can dramatically affect the emergence of the crop. Embodiments of the present invention also provide for selectively applying fertilizer on both sides of a seed row line, which is a practice that is becoming more prevalent for producers.

As previously mentioned, it is important that the fertilizer be applied in the manner whereby the seed bed itself is or will not be disturbed because of the fracturing of the soil by the fertilizer applying apparatus during operation. Such fracturing distorts the seed bed which can significantly affect the emergence of the crop and ultimately the yield. The fertilizer is applied in an opening created by a pair of disks which are configured and oriented to form the opening. The opening is preferably one that has the shape of an asymmetrical V-shape, with the side of the V that is nearer the seed row line (regardless of which side of the seed row line it is positioned) being substantially vertically oriented, and the other side oriented at an acute angle relative to the vertical side. The verticality of the near side of the V-shape opening provides increased accuracy in the lateral spacing of the fertilizer. It is important that the disk that forms the vertical side of the V-shaped opening track straight and true so that fracturing of the vertical side of the opening does not occur.

A known prior art apparatus is shown and described in U.S. Pat. No. 5,752,453 assigned to the same assignee as the present invention. That apparatus has a preset lateral distance between the V-shaped opening and the seed row line, and it is pivotably mounted to a forward frame member (30, shown in FIG. 2 of the patent). The arm member with attached disks are constrained from extensive pivoting by the manner in which the pivot connection is constructed.

Producers have been known to attempt to increase or decrease the lateral distance between the fertilizer application and the seed row line by using brackets, bolts or the like to force the arm member into a different position. However, such actions cause the disks to track at a different angle than straight and true and therefore significantly increase the likelihood of soil fracture and its attendant consequences.

Turning now to the drawings and particularly FIG. 1, apparatus embodying the present invention is indicated generally at 10 and is shown being mounted to a planting implement, indicated generally at 12, which is in turn attached to a tool bar 14 that is part of an overall implement that is drawn from a tractor (not shown). It should be understood that the tool bar 14 extends the width of many rows, with the number of planting implements 12 being provided to plant a predetermined number of rows of seed, such as corn.

Figure 2:
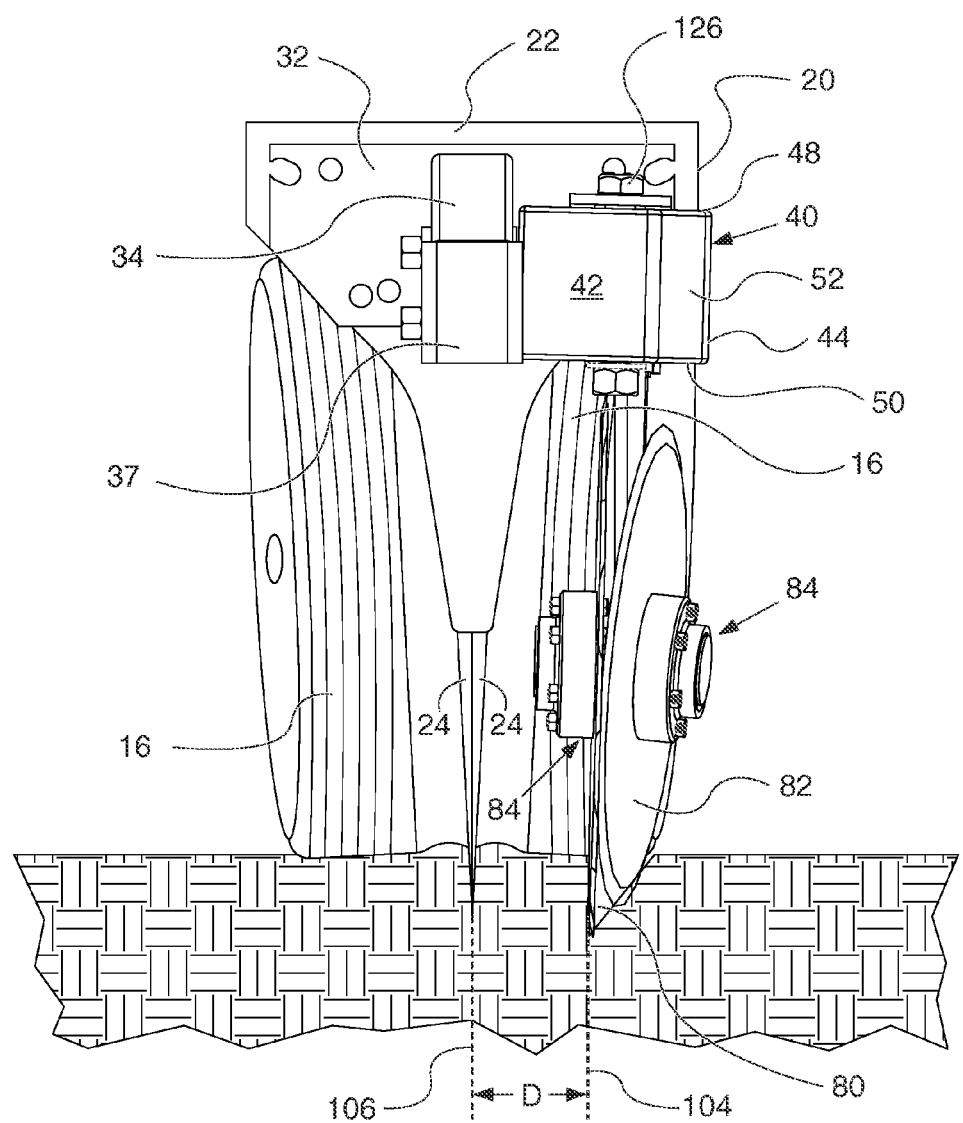
FIG. 2 is a front view of the apparatus embodying the present invention shown together with a portion of the planting implement.
Figure 3:
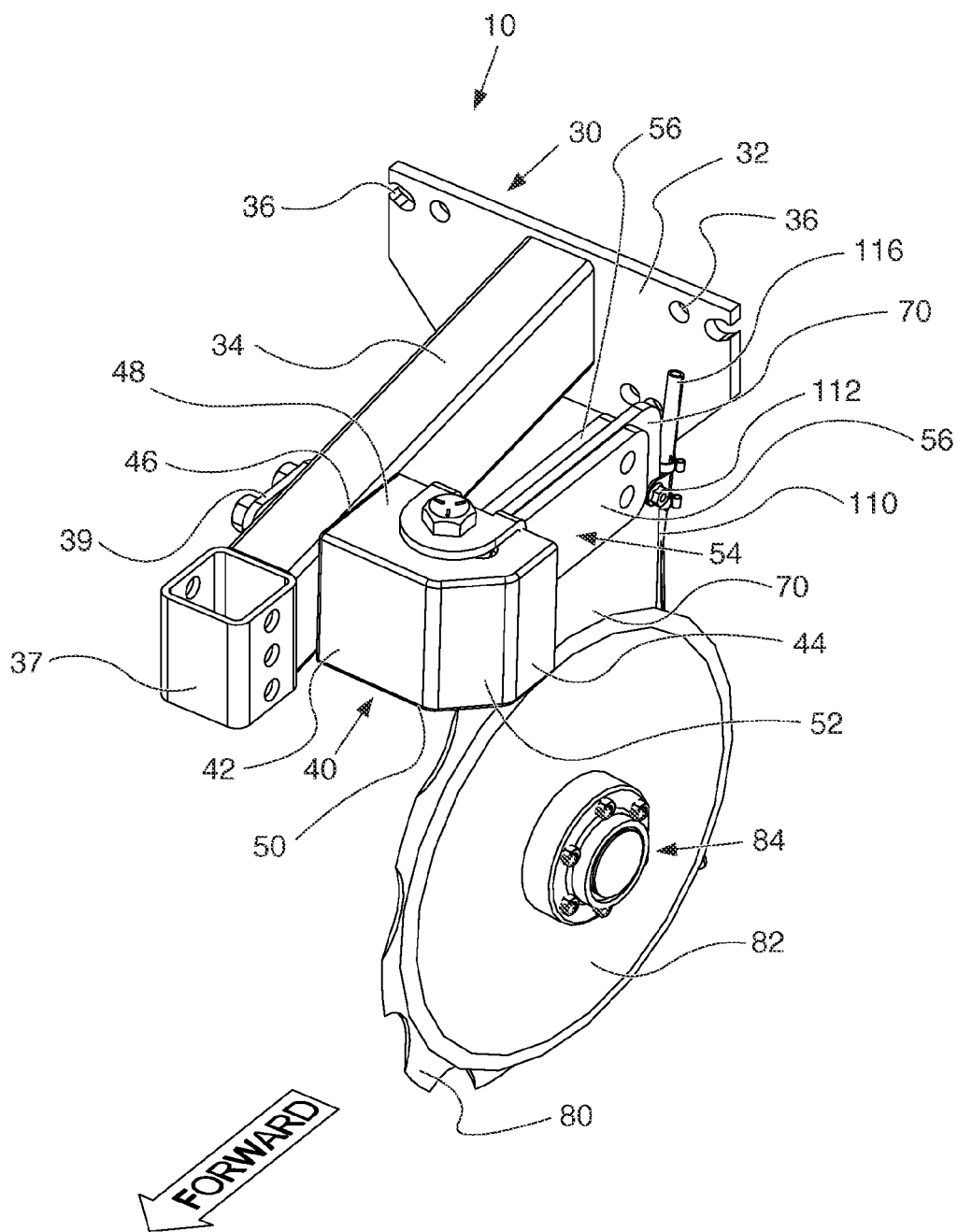
FIG. 3 is a left front perspective view of an embodiment of the present invention.

The implement 12 has a pair of wheels with rubber tires 16 that support the weight of the implement which is pulled in the leftward direction as shown in FIG. 1. A parallelogram linkage 18 is provided and allows the implement 12 to move vertically relative to the tool bar 14 as the planter is pulled through a field. The planter has a structure 20 with a front facing generally vertical mounting surface 22 to which the apparatus 10 can be mounted. The planting implement also has a pair of disks 24 which are configured and oriented at an angle relative to one another to provide a preferably symmetrical V-shaped groove in the ground where seed is planted during operation. A pair of closing wheels 26 is also provided to cover the V-shaped groove in which the seed is planted as well as to close an opening in which fertilizer is placed by the apparatus 10 during the planting operation. It should be realized that the closing wheels 26 are intermediate the pair of wheels 16 which are shown in FIG. 2.

Figure 4:
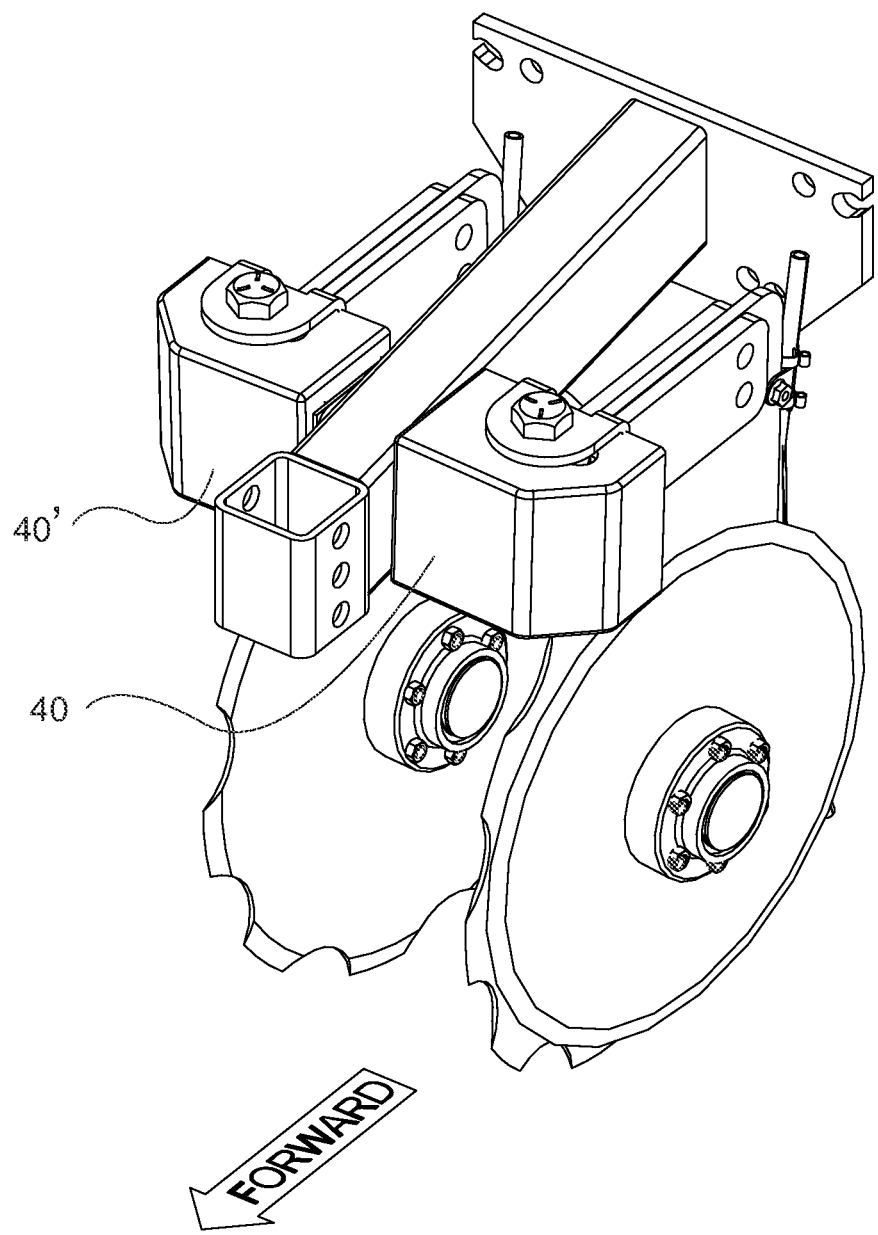
FIG. 4 is a left front perspective view of an alternative preferred embodiment of the present invention.
Figure 5:
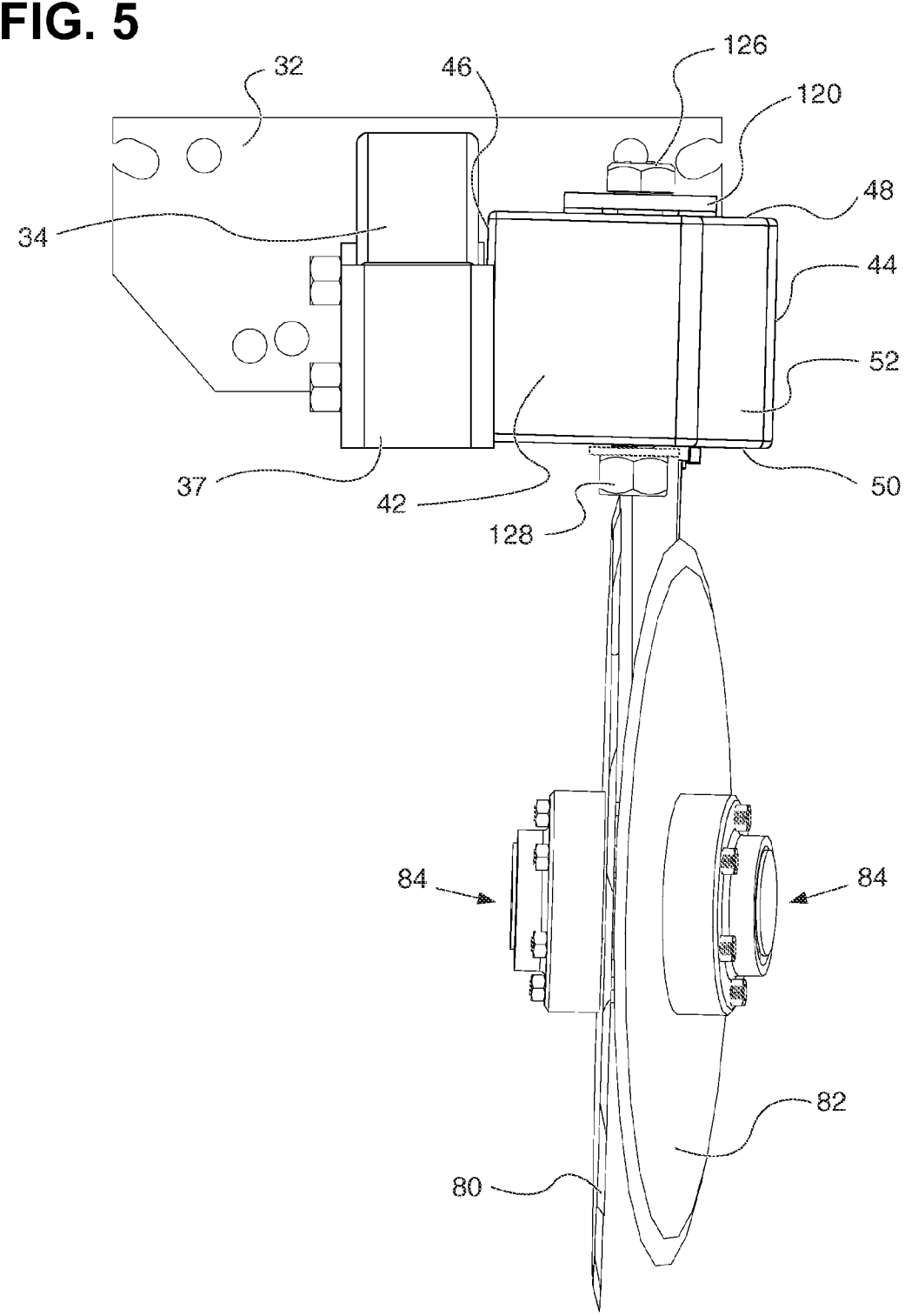
FIG. 5 is a front view of the embodiment shown in FIG. 3.

With regard to a first preferred embodiment of the present invention shown in FIGS. 1, 2, 3, 5, 6 and 7, it is designed and configured to place fertilizer in an opening adjacent to the seed line that is planted by the planting implement 12, with the distance between the fertilizer being placed in the ground and the seed line being adjustable between multiple different predetermined distances. A second preferred embodiment is shown in FIG. 4 which includes a separate fertilizer applying mechanism and disk opening structure so that fertilizer can also be placed in an opening on the opposite side of the seed line, if desired.

The apparatus 10 has a frame, indicated generally at 30, which includes a transverse mounting plate 32 and an elongated frame portion 34 that extends from the transverse mounting plate 32 forwardly of the planting implement 12. The elongated portion 34 is preferably welded to the transverse mounting plate 32 and the transverse plate 32 has a number of apertures 36 that are provided to mount the apparatus to planting units made by different manufacturers. At the forward end of the elongated portion 34 is a square tube 37 which is configured to receive a debris clearing attachment that may be provided for the purpose of clearing a path of cornstalks or other debris that may be present in the field being planted.

A mounting or mount structure, indicated generally at 40, is provided and is shown to be located on the left side of the elongated portion 34 and is preferably bolted to the elongated portion although it may be welded or otherwise attached. The mounting structure 40 is in the form of a generally box-like structure, with a front wall 42, an outside wall 44, an inside wall 46, as well as a top wall 48 and bottom wall 50. The rear side of the structure 40 is open and a truncated wall portion 52 interconnects the outside wall 44 and front wall 42. This truncated construction may be eliminated, if desired, but enables that part of the structure to be slightly less obtrusive and may eliminate the possibility of interference with adjacent parts of some models of planting implements 12.

Figure 6:
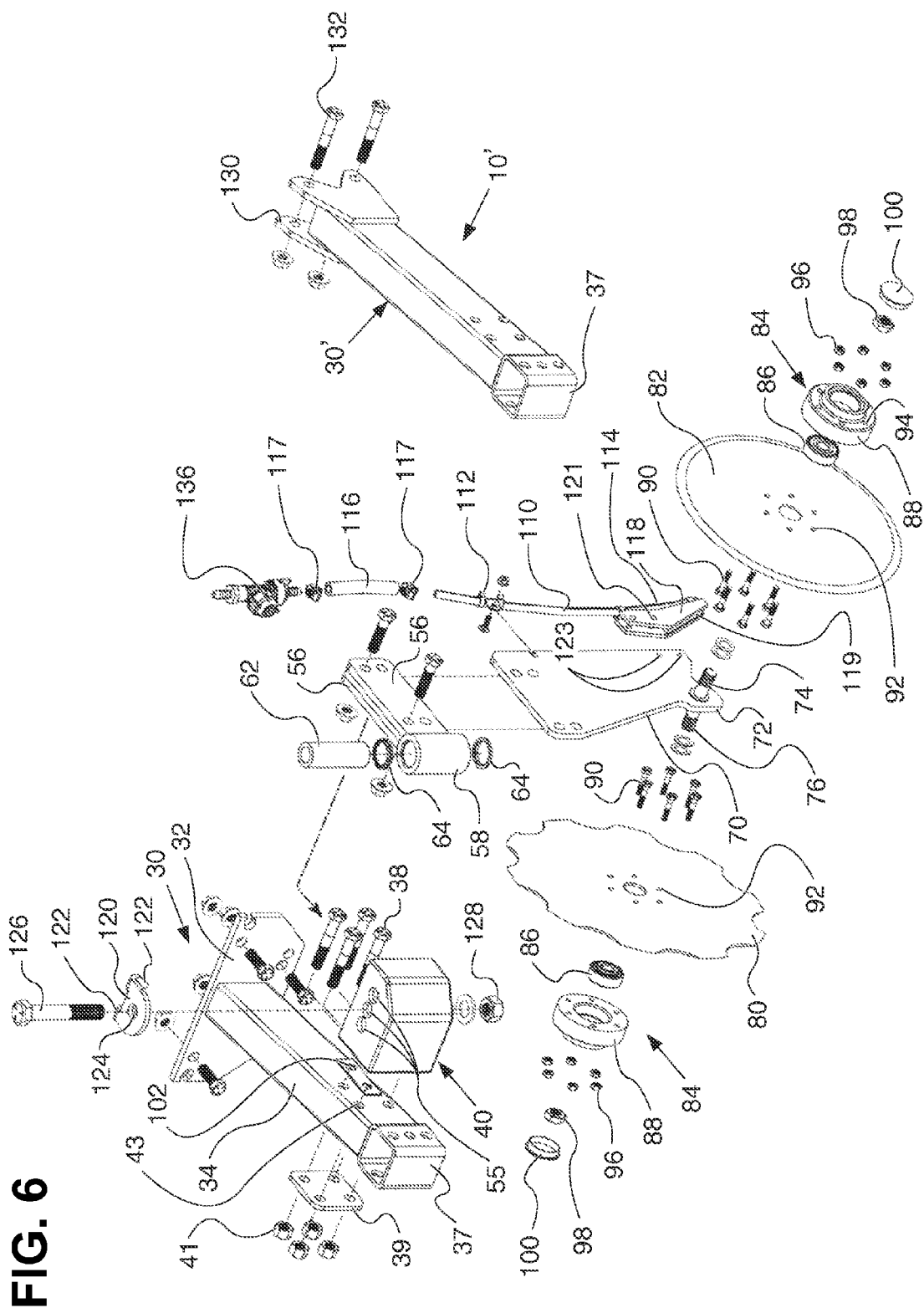
FIG. 6 is an exploded perspective view of the embodiment shown in FIGS. 3 and 5.

The top and bottom walls 48, 50 have at least three sets of aligned separate apertures 55 adjacent one another, as best shown in FIG. 6, which define separate predetermined distances between the apertures 55 and the center of the elongated portion 34 which coincides with the V-shape orientation of the disk 24 of the planter and is coincident with the location where the seed is being planted. Thus, the employment of one of the sets of apertures 55 will determine the distance that fertilizer is placed in the opening made by the apparatus 10. It should be understood that while three sets of apertures are shown, other numbers of multiple apertures can be provided. In this regard, an elongated slot may be used so that any position along the length of the slot may be selected. Alternatively, the slot may be configured to have overlapping curved portions sized to receive a cooperatively sized bolt so that discrete positions along the length of the slot are provided.

The mounting structure 40 is preferably bolted to the elongated portion 34 with bolts 38 which extend through apertures in the near inner wall 46 that are aligned with apertures 43 that are provided in the adjacent sidewall and opposite sidewall of the extension 34. A support plate 39 is also provided for strengthening the connection and nuts 41 screw onto the bolts 38 to hold the mounting structure 40 onto the extension 34. A desirable feature of the design of the mounting structure 40 is that it can be of standard construction and is symmetrical in that it can be mounted on either the right or left side of the forward extension 34 simply by rotating it 180 degrees. An embodiment showing two mounting structures 40 is shown in FIG. 4.

Figure 7:
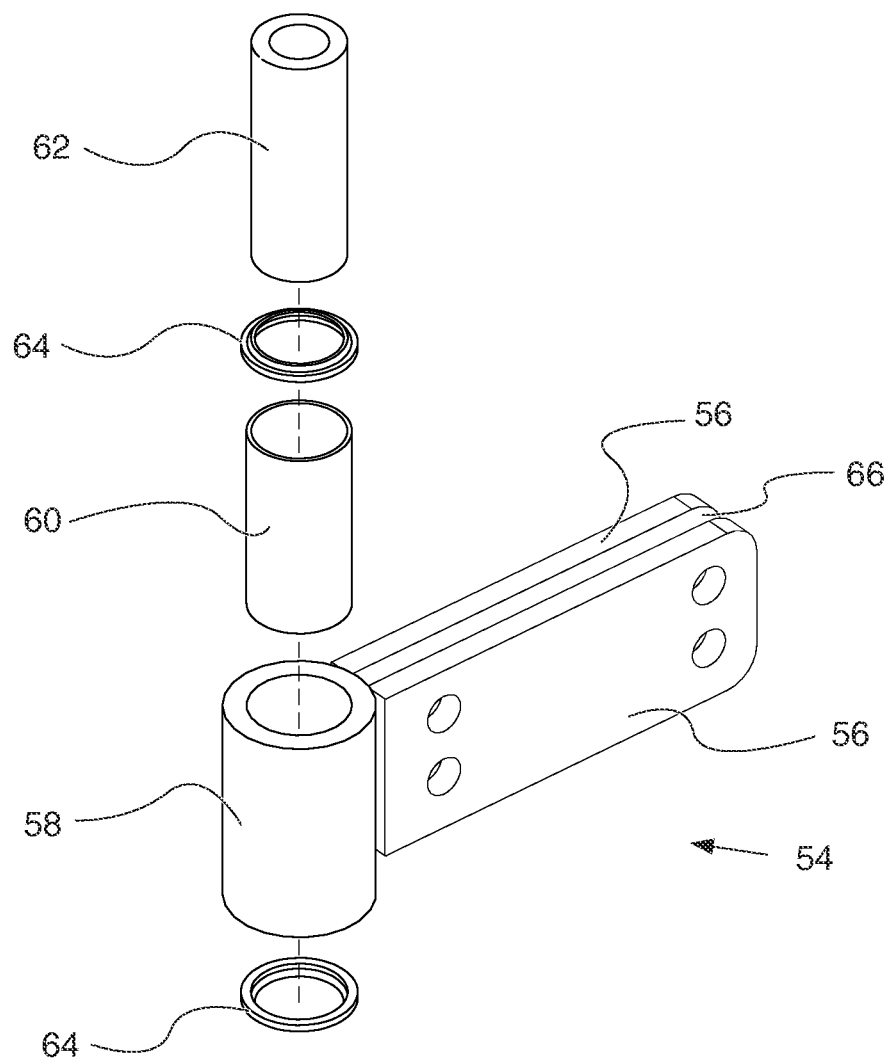
FIG. 7 is a perspective exploded view a portion of the apparatus shown in FIG. 6.

The mounting structure 40 supports a horizontally pivotable arm assembly, indicated generally at 54, which includes a pair of vertically oriented spaced apart arms 56 which are preferably welded to a hollow cylindrical core 58. The core 58 has a length that is slightly smaller than the distance between the inner surfaces of the top and bottom walls 48 and 50 of the mounting structure 40. The arm assembly 54 pivots in the mounting structure 40 by a bearing structure that is shown in FIG. 7.

More specifically, the inside surface of the hollow core is sized to receive a cylindrically shaped bearing 60 that made from a composite material that can include combinations of various metals, or metal and fibrous material or the like. The bearing is preferably pressed into the core 58 and an extremely hard surfaced bushing 62, preferably made of chrome is provided and fits within the bearing 60. Upper and lower preferably urethane or other comparable seals 64 are provided to keep dirt out between the chrome bushing and the bearing 60.

The space between the adjacent inside surfaces of the arm 56, indicated at 66, are sized to receive a substantially flat standard 70 that is preferably bolted to the arms 56. The standard 70 extends downwardly and has a forward lower end portion 72 to which bolts or the like 74 and 76 are provided. In this regard, the angles of the center line of each of the bolts 74 and 76 are relatively precisely determined and effectively determine the angle of disks that are attached to them. For this reason, the bolts 74 and 76 may be a single unitary piece with the angles accurately determined and placed in an aperture in the standard 70 using a jig or some other facility to accurately position the bolts where they are preferably welded in place.

The standard 70 carries a pair of disks, including a Coulter disk 80 and a parting or spreading disk 82. Each of the disks has a hub assembly, indicated generally at 84, which includes a bearing 86 that has inner and outer races, the inner race being associated with the bolt 74 and 76. The outer race of each bearing 86 is attached to one of the disks 80, 82 by a hub 88, wherein the hub holds the outer race of the bearing 86 and it is attached to respective ones of the disks 80, 82 by a plurality of bolts 90 which extend through apertures 92 in the respective disks 80 and 82 as well as apertures 94 in the outer portion of the hub 88 and nuts 96 are tightened onto the bolts 90 to secure the hub assemblies 84 to the respective disk 80 and 82. A nut 98 is provided and is tightened onto the outer threaded end portion of each of the bolts 74 and 76 to engage the inner race of the bearing 86 and the outer race is secured to the hub 88. An end cap 100 is sized and configured to be frictionally engagable with an annular surface of the hub 88 and prevents contaminants from entering into the hub and bearing 86 therewithin.

Although the arm assembly 54 pivots in a horizontal plane, a stop bracket 120 is provided and has downwardly extending end flanges 122 which are spaced apart from one another with the gap between them being slightly larger than the width of the arms 56 and are sized to limit the amount of pivoting to a predetermined angle from center which is approximately within the range of about 5 degrees to about 10 degrees. The bracket 120 has an aperture 124 to which a bolt 126 extends therethrough, as well as through one of the aligned openings in the top and bottom openings 55 in the top and bottom walls 48 and 50 of the mounting structure 40. A nut 128 is used to tighten the bolt that provides the pivot connection for the arm assembly 54.

As previously mentioned, it is possible to provide fertilizer on both sides of the seed line. To that end, an alternative embodiment is shown in FIG. 4 which has a symmetrical mounting assembly 40' which is mounted to the elongated portion 34. In this embodiment, the support plate is omitted and the bolts 38 which bolt the mounting structure 40 to the extension now extend through a set of apertures in the near wall 46 of the mounting structure 40'.

The bolt 76 is attached to the standard 70 so that the Coulter disk 80 is generally parallel to the plane of the standard 70 whereas the bolt 74 of the disk 82 is slightly angled so that the reach of the disk 82 is closest to the Coulter disk 80 slightly forward and near the bottom of the reach of the disk 82. The vertical orientation of the Coulter disk 80 has the effect of preventing accumulation of dirt on the disk 80. It has been found that during operation, it is further desirable to angle the disk a small amount, and to this end a shim plate 102 may be provided between the upper portion of the inner wall 46 of the mounting structure 40 and the extension 34. It has apertures through which the securing bolts for attaching the mounting structure 40 to the extension can pass.

The rotational axis of the parting disk 82 is oriented at angle in the range of about 3 degrees to about 10 degrees relative to the rotational axis of the Coulter disk 80. In this way, a parting cut is made in the ground and the soil separated so that fertilizer can be applied beneath the surface of the ground immediately forward the most rearward reach of the disk 82. The castering action of the apparatus as well as the almost perfectly vertical orientation of the disk 80 is important in minimizing the fracturing of the soil at the row line, particularly between the seed and fertilizer openings.

The outside diameter of the Coulter disk 80 is preferably larger than that of the disk 82 and the Coulter disk 80 preferably has a plurality of notches which have a depth of approximately ¾ to ⅞ of an inch, which also generally corresponds to the outside periphery of the disk 82. The disk 82 has an outside diameter that is about 1½ inches less than that of the disk 80 and it is preferred that the height of the bolts 74 and 76, to which the respective disks 80 and 82 are mounted, be generally the same.

The notches in the disk 82 have the effect of forcing rotation of the disk. While a smooth, i.e., unnotched, disk will normally freely rotate, it is not uncommon for a smooth disk to stick. If the disk is dragged through the field without rotation, there is a much greater tendency for undesirable soil fracturing to occur. The presence of the notches virtually eliminates the possibility that the disk will stop rotating during normal operation, assuming that the bearings are in normal working order.

It is preferred that the Coulter disk 80 be of increased diameter relative to the disk 82 so that the Coulter disk 80 will travel in a line 104 that is substantially parallel to a row line 106 so as to minimize fracturing of the soil where the seed is planted, i.e., along the line 106 defined by the symmetrical V made by the disks 24 as shown in FIG. 2.

It is also in the scope of the present invention to have another alternative embodiment which is shown generally at 10' in FIG. 6. With this embodiment, the frame 30' does not have a mounting plate 32, but has a pair of side brackets 130 which include apertures for receiving bolts 132 for bolting the frame 30' to a structure that may be part of different manufacturers' planting implement.

To deliver the fertilizer, a tube 110 is provided which is attached by a clamp mechanism 112, which is of conventional construction and it attaches the tube to the standard 70. The tube 110 extends to an elevation near the bottom reach of the disk 82 and has an open end portion 114 for communicating either dry or liquid fertilizer into the ground. It is preferred that the tube 110 be vinyl or other flexible tubing having an outside diameter of ⅜ or ½ inch and that the bottom end portion 114 be secured by a similar mechanism 112 to the bottom of the standard 70 and that the tube be rearwardly curved as shown in FIG. 6, although such a curvature is not essential.

The tube 110 is connected to another flexible tube 116 by a suitable conventional clamping mechanism 117 and the tubing 116 is then extended upwardly to a supply of fertilizer such as a fertilizer tank or the like of conventional construction. In this regard, it is possible to apply both liquid and dry fertilizer, although for applying dry fertilizer, it is preferred that the diameter of the tubing 116 be increased to a larger outside diameter than the ⅜ to ½ inch that is particularly useful for applying a liquid fertilizer.

A check valve 136 may be provided to control the flow of fertilizer, with the control being a function of the operation of a supply pump. The pump may be designed and configured to be turned off when the planter is placed in an inoperative position or simply turned off.

The bottom end portion 114 is secured to a scraper 118 that is attached to the standard 70 and has spaced apart front edges 119 which are configured to alternatingly engage the inside surface of the disk 82 as well as the inside surface of the disk 80 for scraping dirt that may accumulate on these disks during operation. The scraper 118 is constructed so that at its location adjacent the disks 80 and 82, it has a width that is slightly smaller than the distance between the adjacent inner surfaces of the disks 80 and 82. The dimensions are provided to enable the scraper to move or wiggle during operation which is effective to significantly improve its scraping or cleaning performance. The movement or wiggling is also enabled by the scraper 118 having two sets of apertures 121 in the side walls for receiving a pair of conventional cylindrical roll pins, with the apertures being slightly larger than the outer diameter of the roll pins so that the scraper 118 can wiggle. The roll pins fit within slightly smaller apertures 123 and are sufficiently compressed that they stay in their position and hold the scraper 118 in place, albeit in a manner which permits the desired wiggle movement.

Importantly, the disk 80 is laterally displaced or offset to the side of the V made by the disks 24 by a distance D that can be adjusted by using different ones of the apertures 55 of the mounting structure 40 as best shown in FIG. 6. The three apertures provide a distance D of preferably approximately 2 inches, 2⅞ inches and 3¾ inches. These distances provide a number of desirable alternatives that producers may wish to employ for the amount and strength of the fertilizer that is being applied and enables the producer to provide an adequate buffer zone of soil between the fertilizer and the seed which will significantly reduce the chances of the fertilizer burning the seed but will be close enough so that the seed can benefit from the fertilizer nutrients. As previously described, other distances may also be used.

It is also desirable to have a depth adjustment that permits the fertilizer to be placed about ½ inch above or ½ inch below the seed or about 1½ inches below the seed. This is accomplished by the vertical position of the standard 70 that is bolted between the arms 56. There are multiple apertures for receiving the bolts that bolt the standard 70 to the arms that permit such adjustment. Other apertures can be provided to permit other adjustment amounts.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. An apparatus for use in applying fertilizer in the ground adjacent to a row line of seeds being planted by a planter during travel in a forward direction, said apparatus comprising:

a frame structure mounted to the planter, and having an elongated portion extending forwardly of the planter, said frame having at least one mount structure extending transversely from a forward end of said elongated portion;

a disk structure mounted to each of said mount structures and configured to be horizontally pivotable about a selected one of multiple pivot points relative to said mount structure, and each of said pivot points being adjustably distanced apart from the row line of seeds being planted by the planter relative to a fixed point of said frame structure;

said mount structure comprises a box having a top wall, a bottom wall and two side walls, a front wall and an open rear portion, said top and bottom walls having multiple vertically aligned spaced apertures defining said multiple pivot points, one of said side walls configured for engaging a corresponding vertical side of said elongated portion;

said disk structure includes an arm assembly that is horizontally pivotably attached to said mount structure at one of said pivot points, a standard attached to said arm assembly and extending downwardly from said arm assembly, and wherein said arm assembly comprises at least one arm attached to a generally cylindrical front end portion and extending rearwardly therefrom, said standard being mounted to said at least one arm to be aligned with said generally cylindrical front end portion;

wherein said selected pivot point is a sole point of attachment of said disk structure to said frame structure, such that said selected pivot point and said standard are aligned in each of the selected multiple pivot points;

said disk structure further comprising first and second disks forming a generally V-shaped opening in the ground as the apparatus travels in the forward direction; and a fertilizer applying structure mounted to said apparatus for delivering a fertilizer into the ground between said first and second disks.

2. The apparatus as defined in claim 1 wherein said frame has a transverse mounting plate attached to said elongated portion for attachment to a surface of the planter.

3. The apparatus as defined in claim 1 wherein said fertilizer applying structure includes a fertilizer delivery conduit structure attached to a rear portion of said mount structure.

4. The apparatus as defined in claim 3 wherein said delivery conduit structure comprises a hollow nylon delivery tube clamped to a rear vertical surface of said mount structure and having an outer diameter of about ¼ inches to about ½ inches for delivering a liquid fertilizer into the ground.

5. The apparatus as defined in claim 4 wherein said delivery conduit structure includes a protective scraper bracket mounted to said mount structure and extending below a bottom surface of said mount structure for engaging ground material immediately forwardly of a bottom end of said hollow nylon delivery tube.

6. The apparatus as defined in claim 1 comprising a mount structure perpendicularly extending from each side of said elongated portion, each said mount structure providing for independent adjustment of said disk structure relative to said elongated portion.

7. The apparatus as defined in claim 1 wherein said first and second axis connections comprise at least one bolt mounted to a front bottom portion of said standard and extending from opposite sides thereof, each disk being attached to a hub having a bearing, said hub being non-rotatably secured to said disk and a nut screwed onto said bolt for securing said hub thereto, and a dust cap fit to said hub covering said nut.

8. The apparatus as defined in claim 1 wherein said disk assembly includes said arm assembly having said hollow cylindrical front end portion having a height less than the distance between the inside surfaces of said top and bottom walls of said mount structure, and said at least one arm being a pair of spaced apart generally parallel arms attached to said cylindrical front end portion and extending rearwardly therefrom, said arms being spaced apart a distance corresponding to the thickness of said standard which is mounted therebetween.

9. The apparatus as defined in claim 8 wherein said arm assembly further comprises a composite bearing pressed into said hollow cylindrical front end portion, a hollow chrome bushing located within said composite bearing and a bolt and nut extending through one of said aligned apertures in said mount structure.

10. The apparatus as defined in claim 9 wherein said arm assembly further comprises an annular recess on the inside portion of the top and bottom of said hollow cylindrical front end portion configured to receive annular seals for preventing dirt to enter between said bearing and said chrome bushing at the top and bottom thereof.

11. The apparatus as defined in claim 1 wherein the lateral distance between each of said multiple vertically aligned spaced apertures are a predetermined lateral distance from the seed row line to select control the distance from the seed row line that fertilizer is injected.

12. The apparatus as defined in claim 11 wherein said predetermined distances are approximately 2 inches, 2⅞ inches and 3¾ inches.

13. The apparatus as defined in claim 1 wherein said first disk is located between said second disk and the seed row line regardless of whether there are two mounts or a single mount.

14. The apparatus as defined in claim 1, wherein said disk structure further includes an arm assembly that is horizontally pivotably attached to said mount structure at one of said pivot points;
   said standard attached to said arm assembly and extending downwardly from said arm assembly;
   said first disk rotatable about a first axis connection that is attached to a first side of a lower end of said standard, said first disk having a first predetermined diameter and being substantially vertically oriented and having its axis connection located rearwardly of said pivot point;
   said second disk rotatable about a second axis connection that is attached to a second side of a lower end of said standard, said second disk having a second predetermined diameter and being generally vertically oriented and having its axis connection located adjacent said first rotational axis of said first disk; and
   said axis connection of said second disk being oriented at a predetermined angle relative to the axis connection of said first disk, said angle being such that the forward reach of said second disk is closely adjacent to said first disk, and said forward reach of said second disk is closest to said first disk slightly forward and near a bottom of said reach of said second disk.

15. An apparatus for use in applying fertilizer in the ground adjacent to a row line of seeds being planted by a planter during travel in a forward direction, said apparatus comprising:
   a frame structure mounted to the planter, and having an elongated portion extending forwardly of the planter, said frame having at least one mount structure extending transversely from a forward end of said elongated portion;
   a disk structure mounted to each of said mount structures and configured to be horizontally pivotable about a selected one of multiple forwardly located pivot points relative to said mount structure, each of said pivot points being associated with the same designated seed row line said disk structure being pulled along the ground as the apparatus is moved forwardly, each of said mount structures being selectively removably attached to at least one lateral side of said elongated portion,
   wherein said selected pivot point is a sole point of attachment of said disk structure to said frame structure,
   said disk structure further comprising:
   an arm assembly that is horizontally pivotably attached to said mount structure at one of said pivot points, said arm assembly is connected to said mount structure using a bracket with downwardly extending flanges disposed for limiting said horizontal pivoting action of said arm assembly within a predetermined angle;
   a standard attached to said arm assembly, said standard carrying first and second rotatable substantially planar disks, each of which is mounted on opposite sides of said standard, said first and second disks forming a generally V-shaped opening in the ground as the apparatus travels in the forward direction;
   a fertilizer applying structure mounted to said apparatus for delivering a fertilizer into said V-shaped opening in the ground;
   wherein each of said multiple pivot points delivers fertilizer into said generally V-shaped opening at predetermined lateral distances from the row line of seeds being planted by the planter, and said arm assembly is constructed and arranged for being freely pivotable about said pivot points within said predetermined angle such that a distance between the row line of seeds and the fertilizer varies based on the predetermined angle during the delivery of the fertilizer.

16. An apparatus for use in applying fertilizer in the ground adjacent to a row line of seeds being planted by a planter said apparatus comprising:
   a frame mounted to the planter, and having at least one mount structure extending from a forward end of the frame;
   a disk structure mounted to each of said mount structures and configured to be horizontally pivotable about a selected one of multiple forwardly located pivot points on said mount structure, each of said pivot points being associated with the same designated seed row line, each of said mount structures being selectively removably attached to at least one lateral side of said elongated portion,
   wherein said selected pivot point is a sole point of attachment of said disk structure to said frame structure,
   said disk structure further comprising:
   an arm assembly that is horizontally pivotably attached to said mount structure at one of said pivot points;
   a standard attached to said arm assembly to which first and second generally vertically oriented rotatable planar disks are mounted on opposite sides thereof, said disks forming a generally V-shaped opening in the ground during movement in the forward direction;
   a fertilizer applying structure mounted to said apparatus for delivering a fertilizer into said generally V-shaped opening;

wherein each of said multiple pivot points delivers fertilizer into said generally V-shaped opening at predetermined lateral distances from the row line of seeds being planted by the planter, and said arm assembly includes a hollow cylindrical front end portion having a composite bearing pressed into said hollow cylindrical front end portion, a hollow bushing located within said composite bearing, and a fastener extending through one of said pivot points in said mount structure.

17. The apparatus as defined in claim 16 wherein said generally V-shaped opening is asymmetrical and has a side of the V nearer said row line that is oriented in a substantially vertical direction.

\* \* \* \* \*